United States Patent [19]

Nakamichi

[11] 3,903,544

[45] Sept. 2, 1975

[54] CASSETTE TYPE TAPE RECORDER HAVING DUAL CAPSTAN TENSIONING MEANS

[75] Inventor: Niro Nakamichi, Tokyo, Japan

[73] Assignee: Nakamichi Research Inc., Tokyo, Japan

[22] Filed: Oct. 4, 1973

[21] Appl. No.: 403,665

[30] Foreign Application Priority Data

Oct. 6, 1972 Japan .............................. 47-100540
Oct. 23, 1972 Japan .............................. 47-122213[U]

[52] U.S. Cl. .................... 360/96; 360/105; 360/130

[51] Int. Cl. .................. G11b 15/29; G11b 15/43; G11b 15/60

[58] Field of Search.......... 360/105, 96, 130, 90–95; 226/108, 119, 195

[56] References Cited

UNITED STATES PATENTS

| | | | |
|---|---|---|---|
| 3,333,065 | 7/1967 | Torok | 360/105 |
| 3,664,672 | 5/1972 | Futikawa et al. | 360/105 |
| 3,800,324 | 5/1974 | Nakamichi | 360/105 |

*Primary Examiner*—Bernard Konick
*Assistant Examiner*—Robert S. Tupper
*Attorney, Agent, or Firm*—Woodling, Krost, Granger & Rust

[57] ABSTRACT

A cassette type tape recorder having a cassette including a tape driven by a pair of capstans with the tape held between the capstans and a pair of corresponding pressure rollers, so that the tape can be tensioned by the downstream capstan having higher peripheral speed than the upstream capstan has, said tape recorder further comprising means to engage the downstream pressure roller against the corresponding capstan just prior to engagement of the upstream pressure roller against the corresponding capstan and a shock absorber to retard the forward movement of the pressure rollers relative to the cassette at the front thereof whereby the impact on the tape can be eliminated upon engagement of the pressure rollers against the capstans so that the tape is tensioned upon initiation of the tape recorder.

7 Claims, 9 Drawing Figures

CASSETTE TYPE TAPE RECORDER HAVING DUAL CAPSTAN TENSIONING MEANS

FIELD OF THE INVENTION

This invention relates to a cassette type tape recorder and more particularly to a cassette type tape recorder having a dual capstan driven cassette therein.

BACKGROUND OF THE INVENTION

In the prior art, a tape recorder having a dual capstan driven cassette comprises a head mounting plate mounted on a chassis for advanced and retracted movement relative to a front face of a cassette and mounting a pair of pressure or pinch rollers together with head means including any or all of reproducing, erasing and recording heads. A tape guide may be often provided on the head mounting plate. The advanced or forward movement of the head mounting plate relative to the front face of the cassette causes the pressure rollers to hold a tape in the cassette with a pair of corresponding capstans in the cassette for driving the tape in one direction and also the head means to engage the tape to record or reproduce the informations on or from the tape. Because of the capstan on the upstream relative to the tape running driven at lower peripheral speed thereof than the capstan on the downstream, the tape tends to be tensioned backward between the capstans by the difference between the peripheral speeds of the capstans during normal operation of the tape recorder. During non-operation of the tape recorder the head mounting plate has the retracted position relative to the cassette, from which when desired to operate the tape recorder, the head mounting plate is made advanced to thereby engage the pressure rollers against the capstans in the cassette with the tape held between the pressure rollers and the capstans for driving it. However, there often tends to occur slack in the tape between the capstans. Substantial time for eliminating such slack in the tape to provide a predetermined tension to the tape causes both recording and reproducing to be effected in an unstable manner during that time to thereby take adverse effect on the reproduced and recording signals from and on the tape. On detailed study of the tape running immediately after the pressure rollers are engaged against the capstans, it has been noted that if the relative advancing speed of the head mounting plate to the cassette is relatively higher, then the tendency for the tape to be slackened between the capstans is further enhanced due to impact of the heads and the associated components on the head mounting plate against the tape.

Also, it is common that the tape on a supply reel in the cassette has an initial slack and that it tends to be slackened in case where it is fed back at higher speed and immediately thereafter without stoppage normally fed for recording or reproducing the tape. In such cases the tape remains slackened for substantial time during which it transiently runs in an unstable manner, resulting in that it has an undesirable initiating characteristic and therefore, a considerably deteriorated performance.

It is well known that the capstans are connected to flywheels for provision of inertia moment on the capstans whereby wow and flutter are prevented on driving the tape. The flywheels are required to have a large diameter for great inertia. However, the large diameter of the flywheels causes them to be occupied in a large space in the tape recorder, thus making the cassette type tape recorder difficult to be compact while it is required otherwise.

OBJECT OF THE INVENTION

Accordingly, it is a principal object of the present invention to provide a cassette type tape recorder having a dual capstan driven cassette wherein on engagement of a pair of pressure rollers against respective capstans a tape in a cassette is adapted to be initially tensioned to initiate the operation of the tape recorder in a desirable manner.

It is another object of the present invention to provide a cassette type tape recorder having a dual capstan driven cassette wherein heads and the associated components are adapted to forwardly move to engage a tape in the cassette at the damping speed at least during final portion of the movement so that the heads and the associated components are shock-absorbed to thereby eliminate possible slack in the tape between the capstans.

It is further object to provide a cassette type tape recorder having a dual capstan driven cassette wherein a tape in the cassette is adapted to initiate its running in a stable manner even if it is subject to steep variation in the feeding speed, such as from backward feeding at higher speed to normal feeding.

It is further object to provide a cassette type tape recorder having a dual capstan driven cassette wherein flywheels for inertia on capstans are provided so that the tape recorder can be compactly assembled.

SUMMARY OF THE INVENTION

In accordance with the present invention, there is provided a cassette type tape recorder having a cassette including a tape extending along the front openings of the cassette and wound between a pair of reels in the cassette, a pair of capstans moved into and removed from said cassette at the bottom thereof corresponding to movement of said cassette to the operating and non-operating positions, head means to engage said tape through some of said openings for operating the tape recorder, a pair of pressure rollers to engage against said capstans with said tape held between said capstans and said pressure rollers and means to carry said head means and said pressure rollers for forward and backward movement relative to said cassette at the front thereof, said tape recorder further comprising means to engage one of said pressure rollers against the corresponding capstan at predetermined time prior to engagement of the other pressure roller against the corresponding capstan, said one pressure roller lying in the downstream relative to running of said tape and said other pressure roller in the upstream and a shock absorber to retard said forward movement of said carrying means relative to said cassette at least during the final portion of said movement.

BRIEF DESCRIPTION OF THE DRAWINGS

The above-mentioned and other objects and features of the present invention will become apparent from the description of the embodiment in accordance with the present invention taken with reference to the accompanying drawings.

DETAILED DESCRIPTION OF THE PREFERRED EMBODIMENTS

Figure 1:
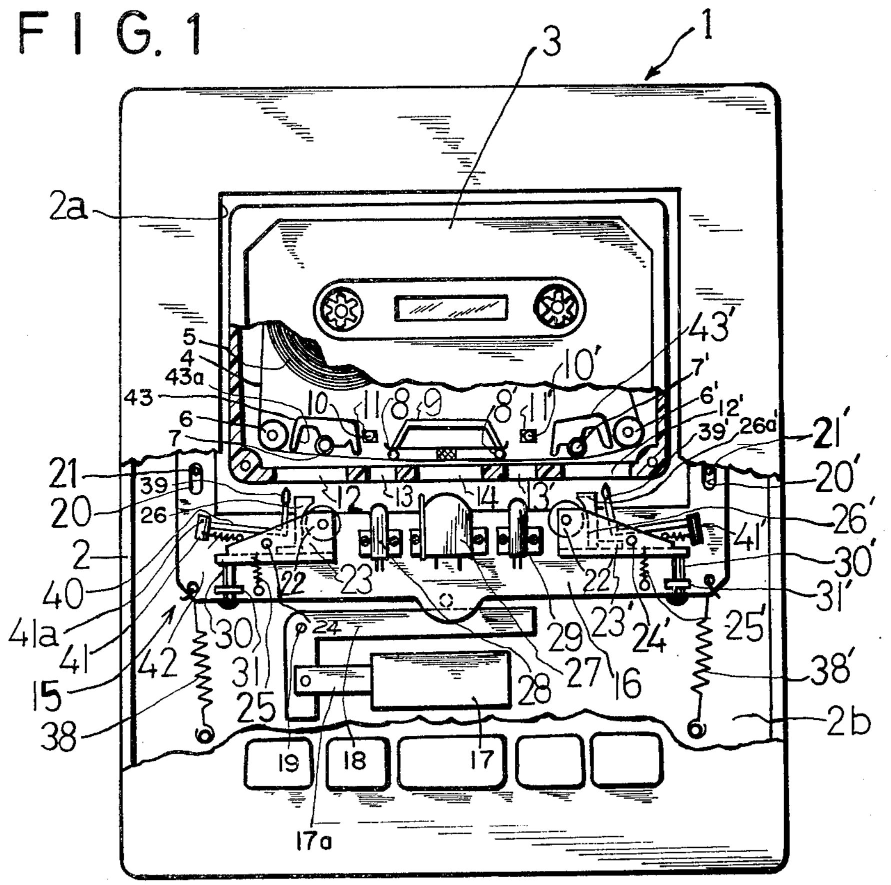
FIG. 1 is a top view of a cassette type tape recorder in accordance with the present invention, with portions broken away for illustration.

Referring now to FIG. 1, a reversibly playing tape recorder is illustrated generally at numeral 1, which comprises a cabinet 2 with a portion thereof shown to be broken away for illustration of the present invention. The cabinet 2 is conventionally provided with a recess 2*a* bottomed to a chassis 2*b*, which receives a cassette 3 having a tape 4 contained and wound between a supply and a taking up reels 5, the former of which is only shown in FIG. 1. As seen from FIG. 1, the cassette has a pair of guide rollers 6 and 6′ provided on the cassette at the front corners thereof and a pair of tape guides 8 and 8′ intermediate of the guide rollers 6 and 6′. The tape guides 8 and 8′ may be mounted on a bracket 9 which is in turn secured to the cassette bottom wall. A pair of capstans 7 and 7′ are rotatably mounted on the chassis of the cabinet and relatively moved into and removed from the cassette through the bottom openings thereof, which will be described hereinafter. The tape 4 passes from the supply reel 5 through the guide roller 6 and then through the capstan 7 to engage the tape guides 8 and 8′, from which it passes through the capstan 7′ and then through the guide roller 6′ to the taking up reel.

The cassette has an operating position shown in FIG. 1 wherein the cassette can be fully received in the recess 2*a* for play of the tape recorder and a non-operating position (not shown) in which the cassette is pivotally raised up at the front thereof for removal from the cabinet 2. In the operating position the cassette may be positioned with a pair of locating pins 10 and 10′ received in pin sockets 11 and 11′ in the cassette 3. Movement of the cassette 3 to the operating position causes the capstans to be relatively moved into the cassette through the bottom opening of the cassette and movement of the cassette 3 to the non-operating position causes the capstans to be relatively removed from the cassette. The capstans 7 and 7′ are conventionally connected to shafts integral therewith and driven by an electric motor when the cassette 3 is in the operating position shown in FIG. 1. The capstan shafts and a driving system therefor will be described hereinafter in connection with FIGS. 7 and 8.

The cassette is provided with a set of front openings 12, 12′, 13, 13′ and 14, two outside openings of which are arranged in a faced relationship to the capstans 7 and 7′, and second inside openings 13 and 13′ of which are arranged adjacent and outside of the tape guides 8 and 8′ and the center opening 14 is arranged between the tape guides 8 and 8′. The openings are adapted to extend heads and associated components therethrough for operation of the tape recorder, as described hereinafter.

Figure 9:
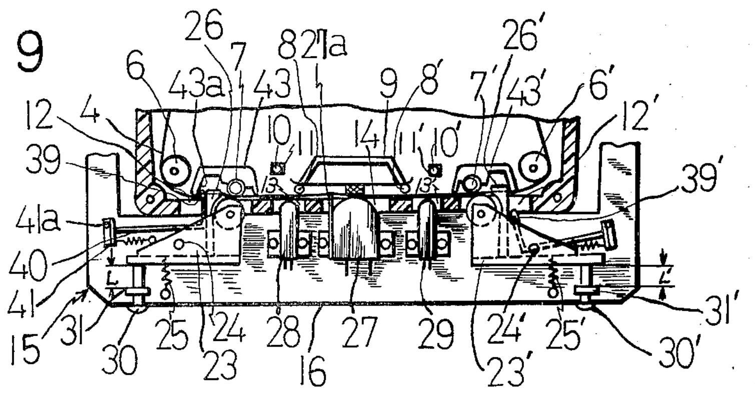
FIG. 9 is a top view of the head mounting plate in the advanced or operating position.

An assembly 15 is provided which comprises a movable head mounting plate 16 with various components provided thereon. The movable plate 16 comprises a substantially U-shaped plate and is disposed in the cabinet 2 in a facing relationship to the front of the cassette in the operating position. On the chassis of the cabinet 2 may be provided an extendable cylinder 17, a piston rod 17*a* of which at the end thereof is connected to one arm portion of a lever 18 which is in turn pivotally mounted on the chassis about an axis 19. The other arm portion of the lever 18 is connected to the movable plate 16 at the middle portion thereof for allowance of lateral movement of the lever arm portion relative to the movable plate 16. Thus, extension of the piston rod 17*a* causes the lever 18 to pivot about the axis 19 to the illustrated position that is a retracted or non-operating position of the assembly 15. On the contrary, retraction of the piston rod 17*a* causes the lever 18 to pivot about the axis 19 in a counter-clockwise direction as viewed in FIG. 1 to the illustrated position in FIG. 9 that is an advanced or operating position of the assembly. A pair of coil springs 38 and 38′, which are disposed adjacent to the corners of the plate 16 and mounted between the plate and the chassis, may preferably urge the head mounting plate 16 to be retracted to the non-operating position. It will be understood that any other suitable means may be employed which advances or retracts the assembly 15. In order to guide the forward or backward movement of the head mounting plate 16 a pair of guide slots 20 and 20′ are provided in the leg portions of the plate 16, which have a pair of corresponding pins 21 and 21′ on the chassis received in the slots 20 and 20′.

Figure 5:
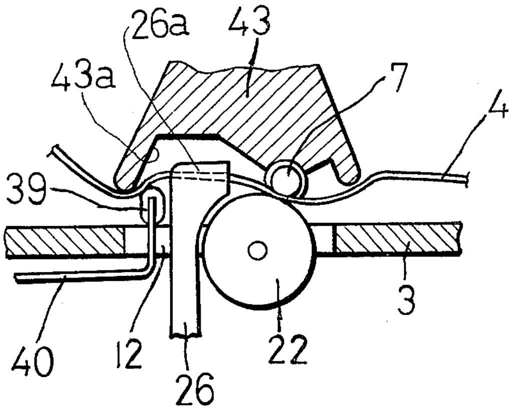
FIG. 5 is an enlarged top view illustrating the condition shown in FIG. 4.

A pair of pressure or pinch rollers 22 and 22′ are rotatably mounted on respective frames 23 and 23′ which are in turn pivoted about respective axes 24 and 24′ on the head mounting plate 16 adjacent to the opposite ends thereof. Coil springs 25 and 25′ are secured at one ends thereof to the respective frames 23 and 23′ and at the other ends thereof to the head mounting plate 16 so that the pressure rollers 22 and 22′ are engaged against the associated capstans 7 and 7′ with the assembly 15 in the advanced position. The frames 23 and 23′ also have respective tape guides 26 and 26′ secured thereto, which comprise grooves 26*a* and 26′*a* in the edges thereof to receive the tape in the cassette as shown in FIG. 5. It will be understood that the components 22, 22′ and 26 and 26′ extend through the openings 12 and 12′ for engagement with the tape 4 and the capstans 7 and 7′ in the cassette 3.

A recording and reproducing head 27 is mounted on the head mounting plate 16 at the middle portion thereof for engagement with the tape in the cassette through the opening 14 thereof when the assembly 15 is advanced to the operating position. The head 27 may be preferably provided with a tape guide 27*a* which comprises a plate-like member secured to the head 27 at one side thereof and including a slot (not shown) passing the tape therethrough in the advanced position of the assembly 15. An erasing head 28 is also mounted on the head mounting plate 16 upstream of the head 27 for engagement with the tape in the cassette through the opening 13 thereof. An erasing head 29 is provided on the head mounting plate 16 to engage the tape through the opening 13' of the cassette to erase the tape for recording the tape by means of the head 27 during its reverse movement.

One of the features of the present invention is to engage the downstream pressure roller 22' against the corresponding capstan 7' at predetermined time prior to engagement of the upstream pressure roller 22 against the corresponding capstan 7. The feature may be achieved by respective adjusting screws 30 and 30' which threadedly extend through ears 31 and 31' on the head mounting plate and engage the frames 23 and 23' for their action against the coil springs 25 and 25' to adjust the capstans 22 and 22' in their pivoted positions. More particularly, the adjusting screws can be threadedly extended and retracted relative to the frames 23 and 23'. The extension length L of the adjusting screw 30 is smaller than the extension length L' of the adjusting screw 30' so that when the assembly 15 advances relative to the cassette 3, the downstream pressure roller 22' firstly engages the capstan 7' for restraint of the tape 4 in the downstream and after predetermined time the upstream pressure roller 22 engages the capstan 7. Thus, the tape 4 is gently fed by the capstan 7' and the associated pressure roller 22' by the distance D which corresponds to the peripheral speed of the capstan 7' times $\Delta t$ wherein $\Delta t$ is the period from engagement of the pressure roller 22' against the capstan 7' to engagement of the pressure roller 22 against the capstan 7. Thereafter, the upstream pressure roller 22 is engaged against the capstan 7 whereupon the tape initiates to be normally fed in a stable manner. Practically, possible slack in the tape between the capstans 7 and 7' is in order of 1 mm to several milimeters and therefore, only 10 to 100 micro seconds are sufficient from engagement of the pressure roller 22' to engagement of the pressure roller 22. The heads 27, 28 and 29 may engage the tape either prior to or after engagement of the pressure roller 22' against the capstan 7', but it should engage the tape at least prior to engagement of the upstream pressure roller 22 against the capstan 7. Delay in engagement of the upstream pressure roller 22 permits the tape to provide no slack on the initial operation of the tape recorder. The timing relationship between engagements of the pressure rollers 22 and 22' against the capstans 7 and 7' can be adjusted by varying the extension lengths of the adjusting screws 30 and 30'.

It should be noted that the coil springs 25 and 25' and the adjusting screws 30 and 30' may be replaced by solenoid means serving to individually pivot the frames 23 and 23'.

Figure 2:
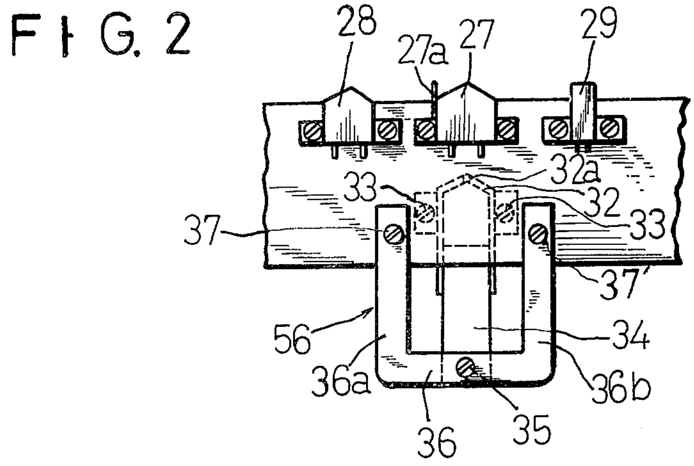
FIG. 2 is an enlarged top view illustrating a portion of a head mounting plate with heads and a tape guide mounted thereon and a shock absorber to retard the movement of the head mounting plate.
Figure 3:
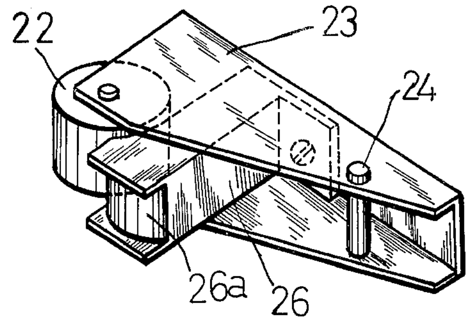
FIG. 3 is an enlarged perspective view of a bracket with a pressure roller and a tape guide mounted thereon.

Another feature of the present invention is to retard or damp relative movement of the assembly 15 to the cassette. This may be achieved by a shock absorber 56 mounted between the head mounting plate 16 and the cabinet chassis 2*b* as shown in FIG. 2. As seen from this figure, the shock absorber 56 may comprise air damper means including a cylinder 32 having base portions secured to the chassis 2*b* by screws 33 and a piston 34 telescopically received in the cylinder 32 and secured by a screw 35 to a U-shaped member 36 which has the leg portions 36*a* and 36*b* secured to the head mounting plate 16 by screws 37 and 37'. The cylinder 32 may be preferably provided with an exhaust port 32*a*. Advanced movement of the assembly 15 by retraction of the cylinder 17 causes the piston 34 to be inserted into the cylinder 32 to thereby compress the air in the cylinder so that the advanced movement of the assembly 15 is damped to retard it. Thus, no shock against the tape in the cassette occurs when the heads 27, 28 and 29 engage against the tape 4, so that slack in the tape is not caused during the initiation of the operation of the tape recorder.

Figure 4:
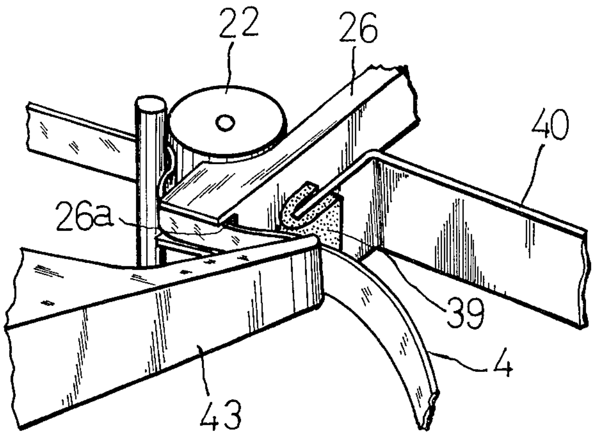
FIG. 4 is an enlarged perspective view illustrating a tape contact member in the operating condition together with engagement of the pressure roller against the capstan and of the tape guide against the tape.

On the head mounting plate 16 of the assembly 15 is provided means to eliminate slack in the tape on the supply reel 5, which may comprise a fibrous contact member 39 mounted on a L-shaped blade 40 at the edge thereof, which is in turn secured at the base end thereof to a lever 41 pivoted about an axis 41*a* on the head mounting plate 16. As seen from FIGS. 1, 4 and 5, the contact member 39 is disposed adjacent to the tape guide 26 so that the member 39 can extend through the opening 12 of the cassette 3 together with the pressure roller 22 and the tape guide 26 when the assembly 15 moves to the advanced position. The lever 41 is urged counterclockwise by a spring 42 mounted between the lever 41 and the head mounting plate 16, so that the contact member 39 is aligned with the slot 26*a* of the tape guide 26. The contact member 39 cooperates with a bearing member 43 provided in the cassette 3 in facing relationship to the contact member 39 in the advanced position of the assembly 15 so that the tape can be held between the contact member 39 and the bearing member 43. The bearing member 43 has the tapered surface 43*a* adapted to slide the excessive length of the tape along the tapered surface 43*a* upon engagement of the contact member 39 with the bearing member until slack in the tape around the supply reel 5 is eliminated.

Figure 6:
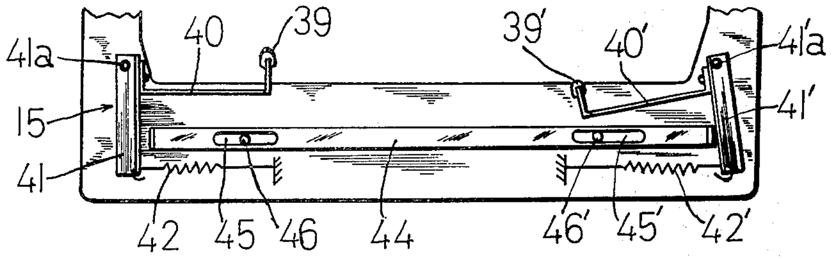
FIG. 6 is a top view of a modification of an arrangement of contact members and the associated components.

Similarly, another slack eliminating device is provided on the head mounting plate 16 adjacent to the tape guide 26' thereon, which comprises the similar components to those of the afore-mentioned slack eliminating means. The components of the device adjacent to the pressure roller 22' and the tape guide 26' are designated by the same numerals to the device shown in FIGS. 4 and 5, with dashes attached thereto. If the left-hand reel (not shown) supplies the tape, then the contact member 39 is moved to the advanced or operating position illustrated in FIG. 6 and if the right-hand reel (also not shown) supplies the tape, then the contact member 39' is moved to the advanced or operating position. In any case, the other contact member 39' or 39 is retracted not to interfere with the tape and with the corresponding bearing member 43' or 43 in the cassette 3. In FIG. 6, means is shown to be provided to effect selective movement of the contact members 39 and 39' to the advanced position. This means may comprise an elongated arm 44 slidably mounted on the head mounting plate 16. Slots 45 and 45' in the elongated arm 44 receive screws 46 and 46' threaded on the head mounting plate 16 so that the elongated arm 44 may be guided by the screws upon its movement. When the contact member 39' is desired to be retracted as shown in FIG. 6, then the elongated arm is moved in the rightward direction to engage the right-hand edge of the arm with the lever 41' pivoted against the spring 42'. If the contact member 39 is desired to be retracted, then the elongated arm is moved in the leftward direction to engage the left-hand edge of the arm with the lever 41 pivoted against the spring 42. Thus, in the reversibly playing tape recorder, the right-hand and left-hand slack eliminating devices are selectively operated by switching the movement of the arm in response to the running direction of the tape. Such switching of the arm movement together with its locking is operatively effected by an operating lever (not shown).

Figure 7:
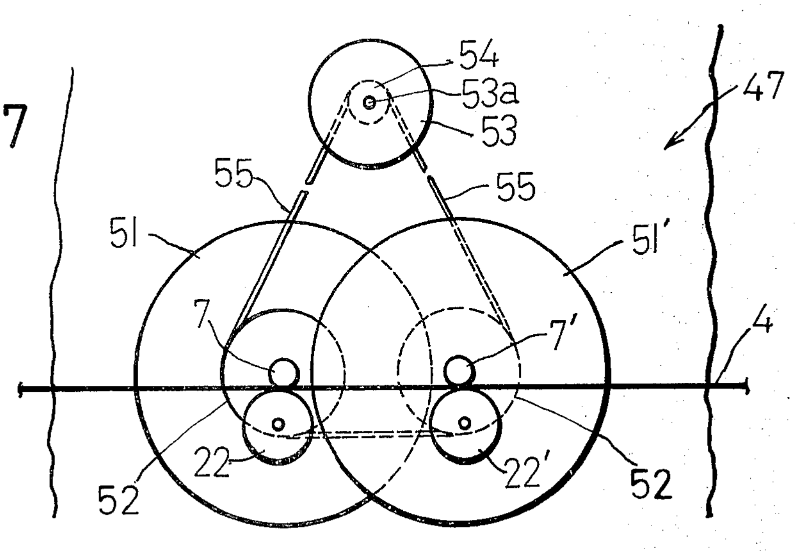
FIG. 7 shows schematically a driving system to drive the capstans in the tape recorder.
Figure 8:
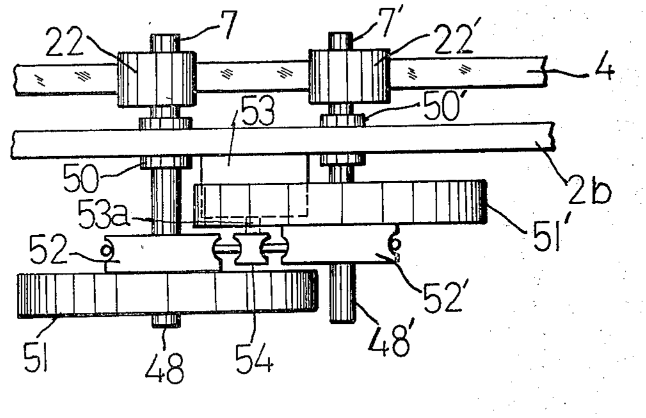
FIG. 8 shows in front elevation the capstan driving system shown in FIG. 7.

Referring now to FIGS. 7 and 8, a driving system for the capstans 7 and 7' is illustrated generally at numeral 47, which comprises shafts 48 and 48' integral with the capstans 7 and 7'. The shafts 48 and 48' may be supported on the chassis 2*b* in the cabinet 2 by means respective bearings 50 and 50' and extend downwardly through the chassis. The shafts have largely diametered flywheels 51 and 51' connected thereto for higher inertia moment to the capstans. The flywheels are shown to be mounted on the shafts in different planes in an overlapped relationship to each other. As seen from FIG. 8, the flywheels 51 and 51' have the outside diameter as large as possible within the range of the defined distance between the capstans shafts 48 and 48', so that wow and flutter can be effectively improved. The capstan shafts 48 and 48' also have respective pulleys 52 and 52' connected thereto in a common plane. An electric motor 53 is mounted on the chassis 49 at the lower surface thereof and includes an output shaft 53*a* with a pulley 54 connected thereto. An endless belt 55 is tensioned in engagement with the pulleys 52, 52' and 54 for rotation of the pulleys 52 and 52' and therefore, of the capstans 7 and 7'. Thus, it will be understood that the flywheels 51 and 51' can have relatively large mass without occupation of the flywheels in a large space.

While one preferred embodiment of the present invention has been described with reference to the accompanying drawings, it will be apparent that some changes and modifications might have been made without departing from the spirit and scope of the present invention, which has been defined only by the appended claims.

What is claimed is:

1. A cassette type tape recorder having a cassette including a tape extending along the front openings of the cassette and wound between a pair of reels in the cassette, a pair of capstans inserted into and removed from said cassette through the bottom openings thereof corresponding to movement of said cassette to the operating and non-operating positions and rotatable in the same direction, head means to engage said tape through some of said front openings for operating the tape recorder, a pair of pressure rollers to concurrently engage against said capstans, respectively, with said tape held between said capstans and said pressure rollers and means to carry said head means and said pressure rollers for forward and backward movement relative to said cassette at the front thereof, said tape recorder further comprising means to engage one of said pressure rollers against the corresponding capstan at predetermined time prior to engagement of the other pressure roller against the corresponding capstan and thereafter engage the other pressure roller against the corresponding capstan, said one pressure roller lying in the downstream relative to the running direction of said tape and said other pressure roller in the upstream and a shock absorber to retard said forward movement of said carrying means relative to said cassette at least during the final portion of said forward movement, said shock absorber connected between said carrying means and the chassis of said tape recorder.

2. A cassette type tape recorder as set forth in claim 1, wherein said pressure rollers engaging means comprises frames holding said pressure rollers and individually pivoted on said carrying means and means to adjust the pivoted position of said frames.

3. A cassette type tape recorder as set forth in claim 1, wherein said shock absorber acts at least prior to engagement of said other pressure roller against said corresponding capstan.

4. A cassette type tape recorder as set forth in claim 1, wherein said shock absorber comprises cylinder and piston means provided between said chassis and said carrying means so as to compress air in said cylinder corresponding to said forward movement of said carrying means, said cylinder having an exhaust port therein to exhaust said compressed air from said cylinder.

5. A cassette type tape recorder as set forth in claim 1, further comprising means to eliminate slack in said tape on the supplying one of said reels, said means including a contact member mounted on said carrying means so as to advance and retract with said pressure rollers, said contact member disposed adjacent to the upstream one of said pressure rollers, and a bearing member mounted in said cassette and cooperating with said contact member to engage excessive length of said tape along said bearing member whereby said tape is tensioned at the portion of said tape passing along said head means.

6. A cassette type tape recorder as set forth in claim 1, said tape recorder having reversibly playing operation and further comprising two means to eliminate slack in said tape on said respective reels, said means each including a contact member mounted on said carrying means so as to advance and retract with said pressure rollers, said contact member disposed adjacent to the corresponding pressure roller and a bearing member mounted in said cassette and cooperating with said contact member to engage excessive length of said tape along said bearing member whereby said tape is tensioned at the portion of said tape passing along said head means, and means to effect selective movement of said contact members in said slack eliminating means corresponding to the selected direction of said tape running in said cassette, so that the upstream one of said contact members relative to the running direction of said tape engages said tape and the downstream contact member is apart from said tape.

7. A cassette type tape recorder as set forth in claim 1, further comprising large diameter flywheels connected to said capstans, respectively, said flywheels disposed in different planes in an overlapped relationship to each other.

* * * * *